United States Patent
Robinson

(10) Patent No.: US 6,806,810 B2
(45) Date of Patent: Oct. 19, 2004

(54) SEAT BELT SHIFTER LOCK SYSTEM

(76) Inventor: Orlando C. Robinson, 20310 Kentfield St., Detroit, MI (US) 48219

( * ) Notice: Subject to any disclaimer, the term of this patent is extended or adjusted under 35 U.S.C. 154(b) by 0 days.

(21) Appl. No.: 10/350,456

(22) Filed: Jan. 24, 2003

(65) Prior Publication Data
US 2003/0169163 A1 Sep. 11, 2003

Related U.S. Application Data
(60) Provisional application No. 60/352,515, filed on Jan. 31, 2002.

(51) Int. Cl.[7] .................................. B60Q 1/00
(52) U.S. Cl. .................... 340/457.1; 340/459; 180/269; 180/270
(58) Field of Search ............................. 340/457.1, 425.5, 340/457, 438, 459; 180/269, 268, 270

(56) References Cited

U.S. PATENT DOCUMENTS

| | | | | | |
|---|---|---|---|---|---|
| 3,863,209 | A | * | 1/1975 | Hollins | 180/270 |
| 4,107,645 | A | * | 8/1978 | Lewis et al. | 180/270 |
| 4,836,323 | A | * | 6/1989 | Kataoka et al. | 180/270 |
| 6,133,827 | A | * | 10/2000 | Alvey et al. | 340/438 |
| 6,278,358 | B1 | * | 8/2001 | Spoto et al. | 340/425.5 |
| 6,533,057 | B1 | * | 3/2003 | Houten et al. | 180/269 |

* cited by examiner

Primary Examiner—Anh V. La
(74) Attorney, Agent, or Firm—David Edwards

(57) ABSTRACT

A seat belt shifter lock microprocessor system is used with a vehicle having an automatic transmission for preventing the shifting from park gear position into a moving gear position of the vehicle until the driver and all passengers are properly secured into their seats and the driver depresses the brake.

6 Claims, 2 Drawing Sheets

SBSL Controller Software Diagram

SEAT BELT SHIFTER LOCK SYSTEM

This application is based on Provisional Application Ser. No. 60/352,515, filed on Jan. 31, 2002.

FIELD OF THE INVENTION

This invention relates to a seat belt safety system for automobiles. More particularly, this invention is directed to a seat belt system that promotes and ensures proper seat belt usage of a vehicle occupants by making sure that the vehicle does not move until all occupants of the vehicle are properly secured in their seats.

BACKGROUND OF THE INVENTION

Prior to the present invention, there have been many proposed systems for assuring that occupants in vehicles are secured therein. In most industrial nations that produce vehicles, laws have been passed to ensure that the manufacturers provide safety equipment in vehicles that protect the occupants. With such governmental requirements and public insistence on protection in vehicles, many patents have attempted to provide a system that will adequately protect the occupants in the vehicle without incurring overbearing expense to the manufacturer and yet be practical and user friendly so that the occupants will use the system and not try to bypass it.

U.S. Pat. No. 3,438,455 (Redmond) discloses a mechanical interlock system for the gear selector control that is positively applied by a spring and retracted by electromechanical means. U.S. Pat. No. 3,859,625 (Eggert) discloses a mechanical interlock system for the travel control means which is independent of the ignition system, after first engerization, and which is of the fail-safe type in which the interlock is normally positively retracted, as by a spring, and extended by electromechanical means when a seat is occupied and yet the belt unfastened. U.S. Pat. No. 3,870,120 (Blinkilde) discloses a transmission locking apparatus that is capable of being accommodated within the tubular shroud of a steering column assembly. This apparatus is composed of a solenoid having a first coil operable to drive a gear selector lever locking member to its lock position when the engine starting mechanism is energized and a second coil is operable to maintain the locking member in the lever-locking position until the driver's body restraining belt is fastened, whereupon the locking member is restored to its non-lock position to enable the gear selector lever to be adjusted to a drive mode.

Although these prior art systems may have solved the safety problems of occupants in the past, with today's many state-of-the-art technological innovations of vehicles and the need to conserve space and weight, they do not meet the new requirements. Hence, there still is a need for smart, economical, and efficient systems that are compatible with today's state-of-the-art technological vehicles.

SUMMARY OF THE INVENTION

The present invention is directed to a seat belt shifter lock (hereinafter referred to as "SBSL") microprocessor system for use with a vehicle having an automatic transmission for preventing the shifting from park position into a moving position of the vehicle until driver and all passengers are properly secured into their seats and the driver depresses the brake.

More specifically, in a safety seat belt system for use with a motor vehicle having an engine ignition system, drive train means including PRNDL control means therefor shiftable between an engine starting position and at least one drive position for transmitting power from the vehicle engine to the vehicle drive wheels, hazard light means, safety seat belt means for releasably securing the operator to the driver's seat of the vehicle and at least one other safety seat belt means for releasably securing at least one passenger to at least one passenger's seat of the vehicle, said safety seat belt means each including a pair of separable seat belt sections, the sections of each pair being adapted to be releasably connected together and providing an electrical circuit through at least one section of the pair when connected, the improvement comprising inserting a seat belt shifter lock (SBSL) control means into the vehicle's wiring circuitry for controlling the movement of the vehicle which is started when ignition voltage is detected in the vehicle by the SBSL control means, signals from the PRNDL switch, seat belt switches, at least one passenger seat sensor means, and brake switch are processed and the SBSL control means sends a signal to the shifter lock solenoid to let the vehicle be placed in a movement gear if all occupants of the vehicle are properly restrained in the seats or to prevent movement of the vehicle if the seat belt of the driver or any passenger is unfastened

DETAILED DESCRIPTION OF THE INVENTION

It has been surprisingly found that a small microprocessor based electronic control module is compatible with current technology of vehicles that can interface with vehicle's wiring systems for producing a smarter, more reliable system that is economical for providing a safer, seat belt restraint system that continues to monitor and assist while a vehicle is being driven.

All vehicles manufactured today have computerized modular, electronic control modules and components that assist in the proper running of a vehicle. The computer has programs in it that not only control the operation of the motor but also can control the temperature in the vehicle cabin as well as monitor the air pressure in the tires. Hence, today's vehicles are quite smart and sophisticated and have many programs in their computer system.

In accordance with the present invention, the SBSL module of the present invention can be either plugged into the wiring harness of the vehicle during manufacture of the vehicle or it can be added after market. Since vehicles have computers, the algorithm of the present invention can also be directly programmed into the computer of the vehicle in order to save space during production of the vehicle.

In accordance with this invention, the SBSL controller means can be a small stand alone digital and solid state circuitry module that plugs into the vehicle's wiring harness of its electrical circuitry and shift lock solenoid and based on readings from other components of the vehicle has the ability to control the shift lock solenoid so that the vehicle will not shift out of the park locked position. All of the components of the SBSL controller module are attached to a printed circuit board ("Pcb"). There are no moving parts in this module but rather operates through electrical signals.

The components of the vehicle that this invention interfaces with are as follows: (a) shift lock solenoid (or shift lock actuator); (b) PRNDL switch, (c) brake switch, (d) hazard switch, (e) driver seat belt switch, (f) front and rear passengers seat sensor, (g) front and rear passengers seat belt switch, and (h) ignition voltage regulator. It should be noted that the driver does not need or have a seat sensor for this system to operate properly.

Figure 1:
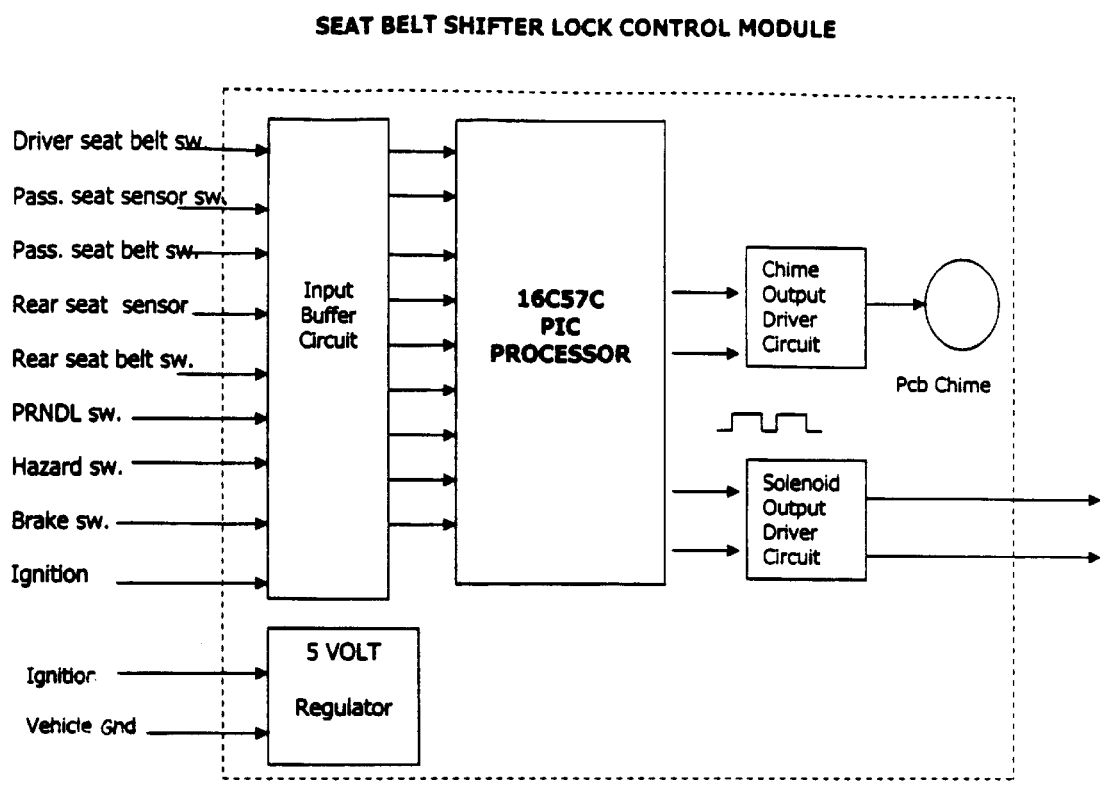
FIG. 1 is a block diagram of the seat belt shifter lock control module of the instant invention.

FIG. 1 shows a block diagram of this SBSL control module where the heart of the unit is an 8-bit microprocessor which receives all of the inputs from the different switches and process them according to the program embedded in the microchips of the processor and responds accordingly. An input buffer circuit is placed between the switch inputs and the microprocessor in order to collect the raw data from the switches and feed the raw data to the processor as needed. The buffer circuit also protects the microprocessor from burning out or disrupting its programming because of power surges as well as the lack of power. Also, a five (5) volt regulator circuit that functions to step down the current from the vehicle (which is 12 volts) to the required five (5) volts and keep the voltage constant in the module. On the input side of the module that is buffered through the buffer circuit, the processor received nine (9) different signals that it must process according to its programming in order to respond properly. A Pcb chime output drive circuit is also part of this module that obtains a signal from the processor in order to send a signal to a chime unit (audio alert) in the vehicle. This processor also provides signals to the solenoid output drive circuit for directing the shift lock solenoid. This is the most important function of the module because the shift lock solenoid determines whether, or not, the vehicle will be operational.

The PRNDL switch lets the module know which gear the vehicle is in at all times. The module also reads the signal from the seat belt switch of the driver and front passenger in order to provide information on whether or not the seat belt is fastened.

The switches that provide input to the SBSL control module are mostly already in the vehicle. The driver seat belt switch is a standard switch that is required in all vehicles worldwide, especially if they are intended for the US market. Normally, this switch is connected to a dashboard light and/or buzzer that lights up and/or peeps for a determined length of time if the seat belt is not fastened when the vehicle is in a drive gear. The front passenger seat sensor switch and the front passenger seat belt switch are also standard (in some domestic and import vehicles) equipment that work together in that the sensor is a pressure sensor that determines whether a passenger is present in the front seat. If a passenger is in the front passenger seat, the seat belt needs to be fastened or a seat belt light and/or buzzer will be actuated to alert the driver and the passenger. In most vehicles today, this will not cause the vehicle to not be able to be placed in a movement gear. It should be noted that the driver does not require a pressure sensor in the driver's seat because if the driver's seat belt is (or is not) fastened and the vehicle is turned on and placed in a movement gear, the program will assume that a driver is present and will act accordingly.

Rear seat sensor switches and rear seat belt switches are not commonly used in vehicles and will have to be added to the rear seat of a vehicle in order to use the present invention. There should be as many rear seat sensor switches and seat belt switches as there are seats in the rear of the vehicle. Normally, there will be two to three seats in the rear passenger area of small to large size vehicles.

The PRNDL switch is standard on all vehicles because it interfaces with the transmission to place the vehicle in the proper gear. The hazard switch is also standard that operates through flashing headlights and rear taillights when the switch is activated. This hazard switch is located normally on the dashboard or steering wheel column. The brake switch and ignition switch are standard where the brake switch provides a signal when the brake pedal is depressed for stopping the vehicle and/or placing the vehicle into a drive gear from the park position gear.

Figure 2:
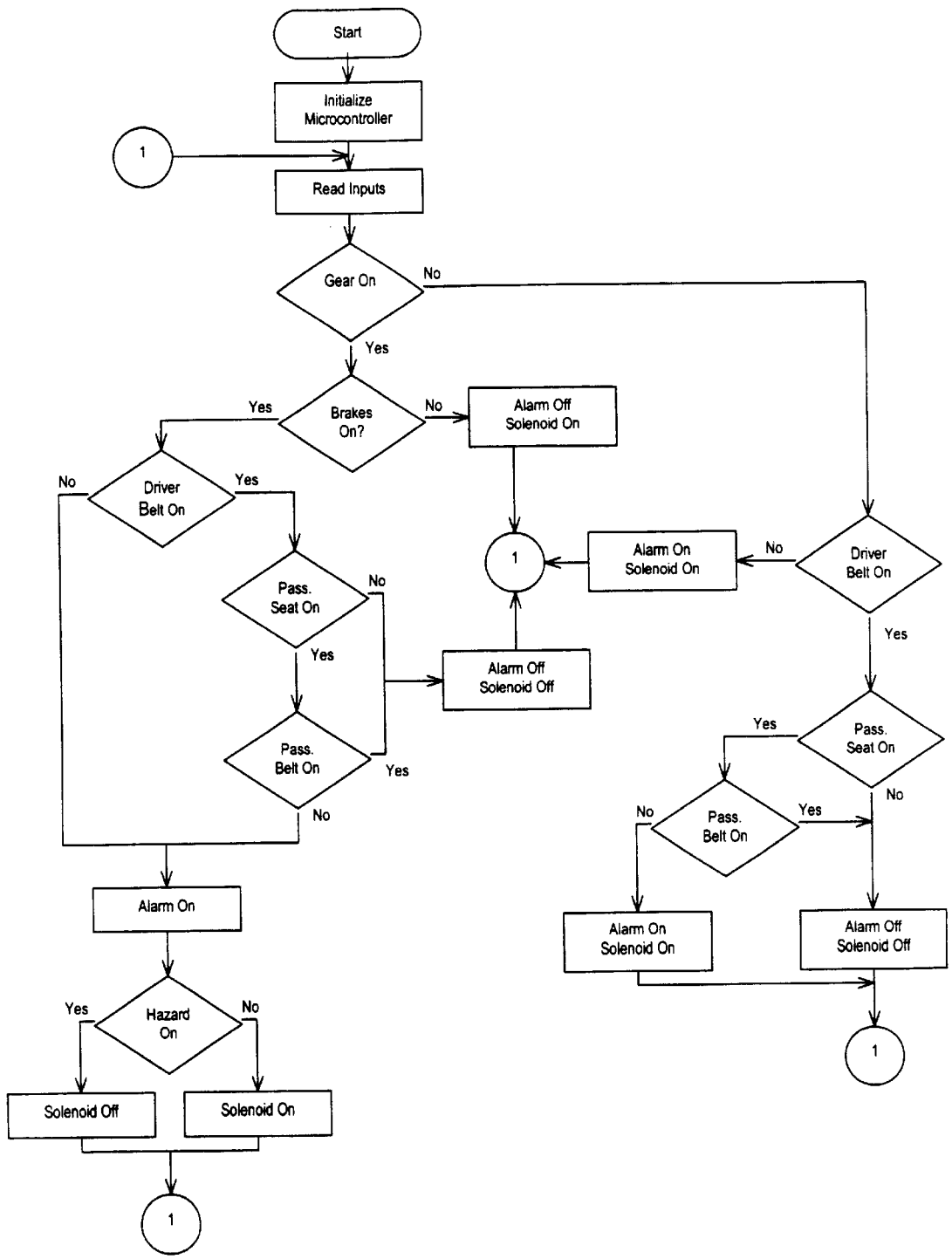
FIG. 2 is a flow sheet diagram of the operation of the seat belt shifter lock control system.

According to the present invention, FIG. 2 shows the flow diagram of the SBSL program that basically has (2) loops. "Loop 1", is where the program reads the "park/neutral" input (parkneu) and detects that the vehicle is in "park" or "neutral" gear position.

"Loop" 2, is where the program reads the "park/neutral" and detects that the vehicle is not in "park" or "neutral" gear position. When the vehicle is not in "park" or "neutral" gear position, it is assumed to be in "drive", "reverse" or some other drive gear. ($1^{st}$ or $2^{nd}$).

The program is started or initiated when the "ignition" input or (keyon) is detected. The program then initializes the outputs, shift lock solenoid (soleout) and audible alert (alerton) to their "off" or non-activated "low" state. (The program uses "true" logic, "low=off" and "high=on").

After initializing the outputs, the program reads the "park/neutral" variable (parkneu) and begins either "loop 1" or "loop 2".

"Loop 1", the vehicle is in the "park" or "neutral" gear position. The program first reads the "hazard" switch input (hazard). If the "hazard" switch is "on", the program then reads the "brake" switch input (brakesw). If the "brake" switch input is "on", the program commands the "solenoid shift lock" output (soleout) to its "on" or "high" state. If the "brake" switch input is "low", "the shift lock solenoid" output (soleout) is commanded "off" or "low" state. The program then loops back around to read the "park/neutral" again. (This is the hazard override routine).

In "loop 1", if the "hazard" switch in not "on", the program reads the "brake" switch input (brakesw). If the "brake" switch input is in the "off" state, the program commands the outputs, (soleout) and (alerton) to their "low" states and loops back around. The program repeats this loop as long as the "hazard" remains "off", "park/neutral" input is "true", and the "brake" switch input is "off".

When the "brake" input is "true" or "on", the program reads the driver's seatbelt. If the driver's belt is unfastened, (the driver "seat belt" input is "true"), the program turns the audible alert output "on" and the solenoid output is commanded to it's "off" state. The program returns and reads the "park/neutral" input. Once again if the vehicle is in the "park" position and the "brake" input is "off", the audible alert and solenoid output is commanded "off".

In "loop 2", the program reads the "park/neutral" input and detects that the vehicle is not in the "park" position (vehicle is now in "drive" gear). During this loop, the program immediately reads the signal from the driver seat belt switch and only reads the passenger seat belt switches when the seats are occupied.

In "loop 2", if the driver seat belt, or detected passenger's seat belt is unfastened, a timed audible alert is commanded "on".

The software routine is initiated or started when ignition voltage is energized by turning the ignition key on and the module detects this signal. The program first reads the PRNDL switch. If the vehicle is in the park gear position, the then program reads the brake switch. In all vehicles, the brake pedal must be depressed before shifting from park into a moving gear position. If the brake switch is on, the program reads the driver seat belt status. If the driver's seat belt is unfastened, the chime output is commanded on and the solenoid output is commanded off. The driver is unable to shift from the park gear position and the audible chime alerts the driver. The audible chime is activated only when the brake pedal is depressed while the vehicle is in park and the driver's belt is unfastened. Similarly, if the program detects that passengers are present via seat sensors, they also are required to fasten their seat belts before the driver can shift from park and the audible chime will be commanded on.

The control software also has an emergency override subroutine. When the vehicle is in the park gear position, and the brake pedal is depressed, while the hazard switch is on, the driver is allowed to immediately shift from the park gear position regardless of the driver or passenger seat belt status.

When the control software detects that the vehicle is in a drive gear position, and the driver's or detected passenger's seat belt are unfastened, a timed audible alert is commanded on. The audible alert will continue to cycle until the detected seat belts are fastened or the vehicle is returned to the park gear position.

The SBSL control module was designed using digital and solid state circuitry exclusively. There are no mechanical or electromechanical components. The core of the system is the SBSL software algorithm and discrete vehicle sensors. The system can be implemented using most original equipment manufacturer's (OEM) equipment with the discrete vehicle sensors.

While this invention has been described with respect to specific embodiments, it should be understood that these embodiments are not intended to be limiting and that many variations and modifications can be made without departing from the spirit and scope of the invention; therefore, only such limitations should be imposed as are indicated by the appended claims.

What is claimed:

1. In a safety seat belt system for use with a motor vehicle having an engine ignition system, drive train means including PRNDL control means therefor shiftable between an engine starting position and at least one drive position for transmitting power from the vehicle engine to the vehicle drive wheels, hazard light means, safety seat belt means for releasably securing the operator to the driver's seat of the vehicle and at least one other safety seat belt means for releasaibly securing at least one passenger to at least one passenger's seat of the vehicle, said safety seat belt means each including a pair of separable seat belt sections, the sections of each pair being adapted to be releasably connected together and providing an electrical circuit through at least one section of the pair when connected, the improvement comprising inserting a seat belt shifter lock (SBSL) control means in the form of a programmable algorithm into the vehicle's wiring circuitry for controlling the movement of the vehicle which is started when ignition voltage is detected in the vehicle by the SBSL control means, signals from the PRNDL switch, seat belt switches, at least one passenger seat sensor means, and brake switch are processed and the SBSL control means sends a signal to the shifter lock solenoid to let the vehicle be placed in a movement gear if all occupants of the vehicle are properly restrained in the seats or to prevent movement of the vehicle if the seat belt of the driver or any passenger is unfastened.

2. The safety seat belt system of claim 1, wherein the SBSL control means is an electronic digital and solid state circuitry control module with no moving parts comprising input means from the switches, an input buffer circuit for collecting signals from the switches, a processor, a voltage regulator circuit for reducing the vehicle voltage to that of the processor and keeping the voltage constant, a chime output drive circuit for interfacing with a chime means of the vehicle, and a shifter lock solenoid output drive circuit for controlling the shifter lock solenoid of the vehicle.

3. The safety seat belt system of claim 1, wherein the SBSL control means is a software program that is inserted on a computer chip of the vehicle by the original equipment manufacturer of the vehicle computer systems.

4. The safety seat belt system of claim 1, wherein when the vehicle is in the park gear position and the brake pedal is depressed while the hazard switch is on, the SBSL control means will permit the driver to immediately shift from park gear position regardless of the driver or passengers seat belt status.

5. The safety seat belt system of claim 1, wherein when the SBSL control means detects that the driver's and/or a passenger's seat belt has become unfastened, a timed audible alert is commanded on with a continuous chime cycle until the detected seat belts are fastened or the vehicle is returned to the park gear position.

6. The safety seat belt system of claim 1, wherein seat sensor means are installed in the rear seat for multiple rear seat passengers that are associated with individual manufacturers vehicle types.

* * * * *